May 13, 1958     W. A. MILLER     2,834,056
MANUFACTURE OF DEPOSITED LATEX ARTICLES
Filed April 7, 1953     2 Sheets-Sheet 1
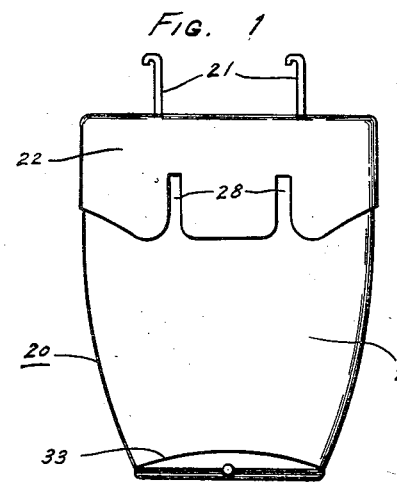
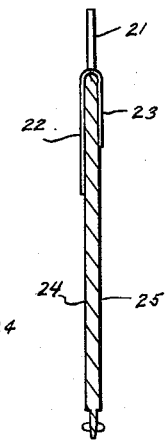
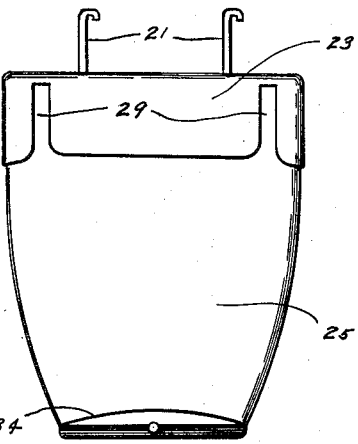
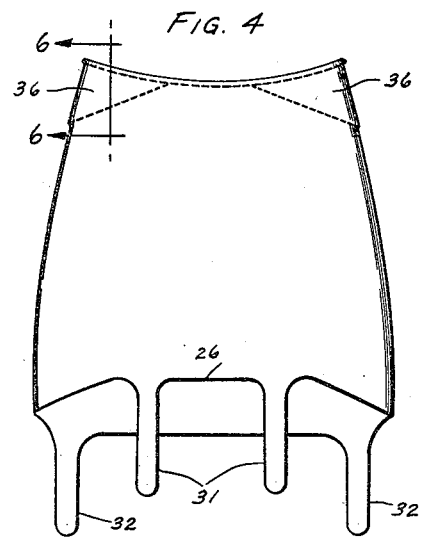
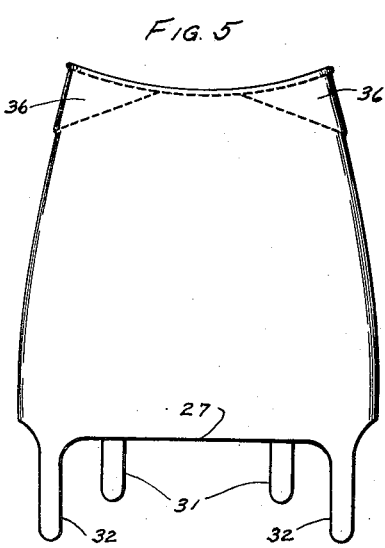
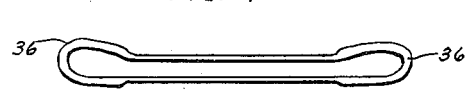
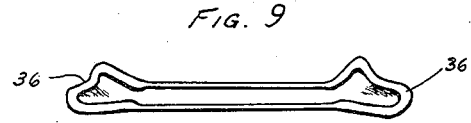
INVENTOR.
WILBUR A. MILLER
BY
ATTORNEY May 13, 1958 W. A. MILLER 2,834,056
MANUFACTURE OF DEPOSITED LATEX ARTICLES
Filed April 7, 1953 2 Sheets-Sheet 2
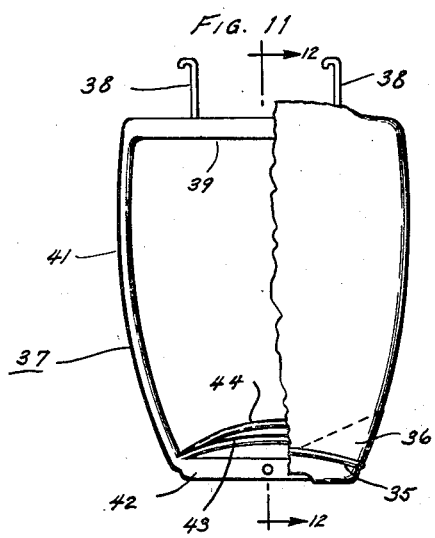
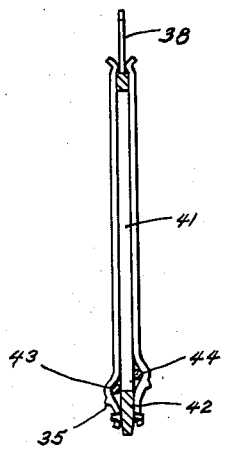
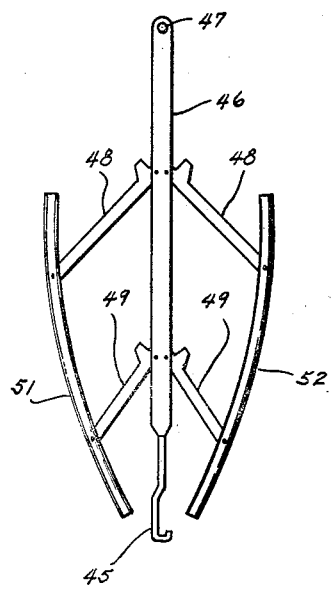
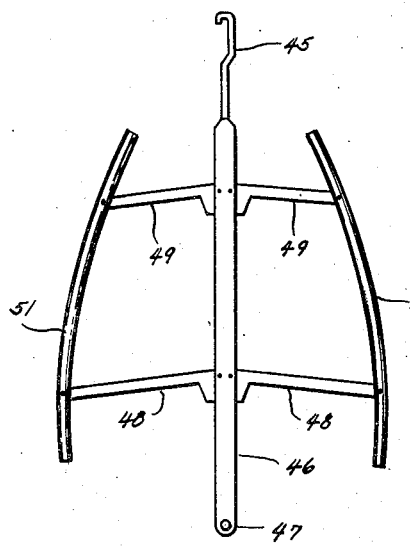
INVENTOR.
WILBUR A. MILLER
BY
ATTORNEY United States Patent Office 2,834,056
Patented May 13, 1958

2,834,056

MANUFACTURE OF DEPOSITED LATEX ARTICLES

Wilbur A. Miller, Dover, Del., assignor to International Latex Corporation, Dover, Del., a corporation of Delaware Application April 7, 1953, Serial No. 347,227

2 Claims. (Cl. 18—58.7)

This invention relates to improvements in the art of making seamless rubber articles, such articles being typically adapted for use as sheaths or envelopes for restraining, protecting or shaping a portion of the human body. A major use of such sheaths has been as rubber girdles, panties and similar undergarments which are economically made from aqueous dispersions of natural rubber or other elastomers, such dispersions being commonly referred to as rubber latex. Because of the public's familiarity with rubber girdles, the present invention will be described as applied thereto. However, those skilled in the art will understand how the invention can be employed in the manufacture of other rubber articles.

Rubber latex girdles, as originally disclosed in U. S. Patent 2,360,736, issued October 17, 1944, to A. N. Spanel, have been satisfactory products, as proven by customer acceptance, but have had their usefulness extended by incorporation of shape retaining reinforcements, such as by providing stiffened and/or thickened areas in the waistband area adjacent to the hips, as disclosed and claimed in patent application, Serial No. 300,319, now Patent No. 2,748,393, filed July 22, 1952, by Fred W. Andrews. However, when such a girdle is formed in the manner set forth in said application, then coated on its outer surface with short cotton fiber filaments while in an undried condition on the original dipping form, and finally cured while still on the original dipping form, it is thereafter turned inside out to be in the normal position for wearing, in which position the coating of fibers acts as soft lining, pleasant to the wearer. It has been found that this procedure frequently results in a product which folds in and/or distorts in the waist band area when the girdle is in a relaxed position, such as lying flat on a table for inspection by a potential buyer. In such a state, the girdle, although capable of functioning correctly, lacks visual appeal and accordingly is considerably less saleable.

Such distortions are economically eliminated by the present invention without sacrificing the advantages offered by the inclusion of shape retaining reinforcements in the girdle or the economical and effective method described herein for incorporating a lining of cotton fibers in the girdle, as will be apparent from the methods described in the following specifications, particularly pointed out in the claims and illustrated in the drawings in which:

Figure 1 is a front elevation of a dipping form suitable for making a girdle having shape retaining reinforcements;

Figure 2 is a rear elevation of the dipping form of Fig. 1;

Figure 3 is a vertical cross section of the form of Fig. 1;

Figure 4 is the front elevation of a girdle made on the form shown in Fig. 1, the girdle not being in use but in a relaxed position, as on a table;

Figure 5 is the rear elevation of the girdle of Fig. 4 in a similar position;

Figure 6 is a greatly enlarged sectional view of a shape retaining reinforcement of the girdle of Fig. 4 taken along the lines 6—6;

Figure 7 is a top view of the girdle of Fig. 4;

Figure 8 is a top view of the girdle of Fig. 7 after being turned inside out;

Figure 9 is a top view of an alternate position taken by the girdle of Fig. 8;

Figure 10 is a top view of the girdle shown in Figs. 8 and 9 after treatment in accordance with the invention;

Figures 11 and 12 are front and vertical cross sectional views of a form and girdle for treatment according to a preferred embodiment of the invention, with part of the girdle broken away to show the construction of the form;

Figure 13 is a front elevation of an alternative embodiment of a form for practice of the invention; and Figure 14 is the form of Fig. 13 in an expanded position.

A typical dipping form, indicated generally at 20, for making a deposited latex girdle, such as that illustrated in Figs. 4, 5 and 6, is illustrated in Figs. 1, 2 and 3. Form 20 is provided with hook-like supporting members 21 which project from the top of the form and are used to support the form during dipping process and to hold the form while the partially finished girdle is stripped off the form. The form has bosses on both the front and the back of the form, such bosses constituting slightly elevated surfaces 22 and 23, respectively, which project upwardly from main generating surfaces 24 and 25. These bosses, which define the lower reinforced marginal edges 26 and 27 of the front and the back of the girdle shown in Figs. 4 and 5, are provided with substantially perpendicular walls joining the surfaces 22 and 23 and surfaces 24 and 25, respectively, the function and action of which, during dipping, is clearly set forth in U. S. Patents 2,015,632 and 2,086,481, issued September 24, 1935, and July 6, 1937, respectively, to A. N. Spanel. The bosses have elongated ribbon-like channels 28 and 29 which constitute integral continuations of the main girdle generating surfaces 24 and 25, respectively, and which serve to form garter tabs 31 and 32 of the girdle in Figs. 4 and 5, all as described more fully in U. S. Patent 2,360,736. Main generating surfaces 24 and 25 terminate in latitudinally arcuate edges 33 and 34 which define the top of the finished girdle and which cooperate with perpendicular inwarding extending walls joining these edges with the bottom of the form so as to form a trimming edge 35, as seen in Figs. 11 and 12.

Figs. 4, 5 and 6 illustrate a girdle prepared on the form shown in Figs. 1, 2 and 3 and having shape retaining reinforcements or areas 36 in the waistband region at the top of the girdle. Such reinforcements reduce the tendency of the upper or top edge of the girdle to roll over without sacrificing satisfactory elasticity at the waist zone. Such reinforcements may comprise a stiffened area generated by dipping the lower corners of the form in a coagulant for latex, such as an acid or a salt solution or a known equivalent, or by masking the form and spraying the corners only with a coagulating liquid or by affixing a patch of stiffer rubber to the corners and thereafter dipping the form repeatedly into compounded unvulcanized latex to build up a film having a dried thickness in its reinforced areas generally of about 20 to 50 thousandths of an inch, the thicker and stiffer reinforced areas generally being several times the thickness of the unreinforced areas. Inasmuch as the whole dipping form, which can be seen to be larger than the finished girdle, is placed in the bath of latex, a continuous film of greater extent or surface than the finished girdle is generated on the dipping form. In other words, the film extends beyond the trimming edges for the top and bottom of the girdle.

Immediately after the final dip and while the outside surface is still wet (i. e., the latex is liquid rather than solidified), the form is moved to a coating chamber where extremely short cotton fiber filaments, such as from 0.5 to 1.5 millimeters long, are blown through spray nozzles against the wet or liquid surface of the latex film at a velocity such that the filaments become embedded in the surface. When the maximum amount of filaments has been embedded in the surface, the form is withdrawn from the coating chamber and the latex film substantially completely solidified. Such solidification is advantageously achieved without complete curing or vulcanization by drying, as when a heat sensitive latex is used for dipping. A typical drying operation comprises contacting the film with hot air at about 150° F. for about 30 minutes, the exact temperature and time necessary to achieve solidification without complete curing depending on the sensitivity to vulcanization of the latex employed, the percentage of water in the film and like factors. Alternatively, the film can be solidified by the use of a coagulant, for example, by the use of a calcium nitrate or chloride solution, acetic or formic acid or other known coagulants. Other methods, such as electric methods, may be employed to coagulate or solidify the film. In any event, the film is solidified, as by the partial curing effected by drying, so that it can be removed or stripped from the form in an unruptured condition. Advantageously, the partial curing effected by drying may be supplemented by additional partially curing, such as not more than a five-minute dip in water held at about 200° to 220° F., to reduce tackiness and to impart additional strength.

The incompletely cured deposited film, if it were removed from the form and trimmed, would be in the shape of the sheath or girdle shown in Figs. 4 and 5, and when in a relaxed position on a horizontal plane surface, would assume the shape shown in Fig. 7. However, such an incompletely cured girdle would lack adequate strength for normal use and would tear or rip so easily that customer dissatisfaction would force the product off the market. Accordingly, it has been commercial practice to impart additional strength to the film on the form by completely curing or vulcanizing it, such as by placing it in a forced draft curing oven held at approximately 230° F., for a period of approximately 30 minutes. However, it has been observed that, when a cured film comprising shape retaining areas is stripped from a dipping form and trimmed, as explained in U. S. Patent 2,360,736, to form a girdle similar to that shown in Figs. 1 and 2, such a girdle will flop over as shown in Fig. 8 in many cases and, if it does not flop over, will form a doubly reverse curve at each side as shown in Fig. 9. This effect apparently is due to the fact that the girdle takes a permanent set or cured configuration which is so accentuated by the additional stiffness of the shape retaining areas that it is not overcome when the girdle is normally turned inside out, as for wearing or presentation to a potential customer.

In accordance with an embodiment of the present invention, the undesirable flop over characteristic of a girdle made from a film comprising a shape retaining area adjacent the waistband region is avoided by stripping such a film from the original dipping form, and placing it on a stretching form or rack, indicated generally at 37, in a reversed condition (i. e., with the inner surface of the film as deposited on the dipping form reversed to form the outer surface), while still in an uncured or partially cured condition. The shape of form 37 is generally similar to that of the original dipping form but is somewhat larger, particularly in the thickened or shape-retaining areas, as described more fully below, and consequently maintains the reversed film in a stretched condition. The film in its stretched condition on the form is then completely cured, as, for example, was described above, and thereafter removed from the form in a permanently set or cured configuration so that, after trimming, it will assume the desired configuration in a relaxed position, such as lying on a table, as shown in Fig. 10.

Form 37 comprises upper hook-like members 38 for supporting the form during curing, hook-like member 38 being affixed to bar or strip 39 which serves as the top of form 37. As shown in Fig. 11, the sides of form 37 are desirably formed from solid bars 41 shaped so as to reproduce the shape of the sides of the dipping form 20, except that strip 39 is longer by a small amount, such as from about one-quarter to one inch and preferably one-half inch, than the corresponding portion of dipping form 20. The bottom of bars 41 are rigidly held in position by affixing them to bottom member 42, which may consist of a downwardly tapered plate, as shown in Fig. 12, which plate advantageously reproduces the shape of the bottom of the dipping form shown in Figs. 1 and 2. Affixed to bottom plate member but curved upwardly, as shown in Fig. 11, are tension exerting members comprising bars 43 and 44, which are affixed to the front and back of the stretching form or rack, respectively. Bars 43 and 44 are curved and positioned so as to lie inwardly, such as from about one-quarter to one-half inch, in respect to the main body of the girdle, from the trimming edge 35 of the girdle.

Stretching form 37 can conveniently be employed in accordance with a specific aspect of the present invention, by placing a dipping form on which there is a partially cured and solidified film, which has had the texture of its outside surface modified by coating it with short cotton filaments, in the position shown in Fig. 1 immediately above a stretching form 37 positioned with hook-like members 38 projecting downwardly (i. e., in the reverse position to that shown in Fig. 11). The film can then be stripped from the dipping form and placed on stretching form 37 in essentially one motion; an operation which results in placing the film inside out on stretching form 37. The stripping operation is advantageously effected by cutting the film deposited along the bottom edge of the dipping form so as to leave an aperture from about one-quarter to one-half of the total length of the bottom of the form and cutting a second aperture in the film along the top of the dipping form past members 21 so as to leave one or two inches of film adjacent the edges of the form. The film is then stretched or pulled from the form carefully so as to avoid rupture of the still somewhat fragile film and then is stretched over the top of stretching form 37, the pulling operation being continued until the top of the film is in its proper position over the top 39 of stretching form 37, which top is at the bottom of the form as held in position by firmly supporting strip 39. The film is carefully adjusted on stretching form 37 so that trimming edge 35 of the film is in the proper position, such as from about one-quarter to one-half inches outward of members 43 and 44 so that during the subsequent curing operation a greater amount of tension is placed upon thickened areas 36 and upon the trimming edge 35. Such greater tension on these selected parts or areas of the film actually distorts such areas or parts into a configuration similar or identical to that ultimately desired. The subsequent curing produces a permanent set which, inter alia, advantageously tends to hold the trimmed edge toward the body of the wearer. The uncut portions of the top and bottom of the film aid in maintaining the film on the form in the desired position. The film is now in position for the final curing operation, after which it is trimmed by removing the material around the garters and bottom edge and around the top edge.

Alternatively the stretching rack may be one which is expandable as shown in Figs. 13 and 14 which show the rack in contracted and expanded positions respectively. The rack shown in Figs. 13 and 14 consists of a hook-like member 45 for supporting the rack and film during the curing operation, which is attached to a vertical main supporting member, such as strip 46, having supporting means, such as lugs 47, at the bottom thereof for supporting the rack when in an inverted position. Pivoted in recesses on each side of strip 46 are upper and lower arms 48 and 49, the outer ends of which are pivoted in recesses of shape generating members such as bars or tubes 51 and 52.

The expandable stretching rack shown in Figs. 13 and 14 is employed, in accordance with an aspect of the present invention, in a manner somewhat different than is the rack shown in Figs. 11 and 12 but accomplishes the same result. Thus a deposited and partially cured film is stripped from a dipping form such as that shown in Figs. 1, 2 and 3, in the manner described above, so that the film is turned inside out. The film is then placed over expandable rack while it is held in the position shown in Fig. 13 by pulling the girdle over the rack from the bottom. The rack is then turned upside down or inverted so that it is in position shown in Fig. 14, with arms 48 and 49 fully extended and a little past dead center, arms 48 and 49 being so dimensioned so that tension is maintained on the film and arms 48 and 49 are held in position. The film is thereafter completely cured and trimmed to form a finished girdle as described above.

Because the dipping form shown in Figs. 1, 2 and 3 is broader below the top of the form, it can be employed to achieve many of the desirable effects of the methods described above, by replacing an incompletely cured film having shape retaining areas on the waistband area on the dipping form in an inside out condition and positioning the top of the film below the top of the dipping form so that the waistband region is stretched over the broader portion of the form corresponding to the hip portion of the girdle. The film can then be finally cured, as described above, so that the finished girdle has a permanent set in the desired configuration.

As is apparent from the foregoing description, the present invention affords methods whereby a girdle having shape retaining areas adjacent the waistband region is processed so that it has a pleasing appearance in a relaxed state, such as lying on a table, in that the girdle lies flat with pleasingly curved sides, as shown in Fig. 10. The present invention can be employed to produce a variety of final girdle sizes from a smaller number of dipping forms by stretching the incompletely cured films varying amounts. Additionally, the present invention affords efficient and economical methods for overcoming a serious production difficulty, so that the consuming public benefits by its use.

Although the present invention has been described with particularity with reference to preferred embodiments and various modifications thereof, it will be obvious to those skilled in the art, after understanding the invention, that various changes and other modifications may be made therein without departing from the spirit and scope of the invention and the appended claims should therefore be interpreted to cover such changes and modifications.

I claim as my invention:

1. The method for imparting a desired appearance to a shaped rubber latex girdle comprising an inner lining of short cotton filaments and shape retaining reinforcements adjacent the waistband region, said reinforcements being generated during the dipping of a form in rubber latex, which comprises removing an incompletely cured film comprising said reinforcements and said lining from the dipping form on which it was generated and simultaneously reversing the surfaces of said film, stretching the waist band of said film with the surfaces still reversed on a stretching form similarly shaped to said dipping form but wider in said waistband region and comprising tension exerting members adjacent the trim edge at the top of the girdle, said film being positioned to extend beyond said tension exerting members, completely curing said film while so positioned on said stretching form, removing said film from said stretching form and trimming it to form a girdle that, when in a relaxed position on a horizontal surface, assumes a flat configuration with desired curved sides.

2. The method for imparting a desired appearance to a shaped rubber latex garment comprising a thickened reinforcement, said reinforcement being generated during the dipping of a form in rubber latex, which comprises removing an incompletely cured film comprising said reinforcement from the dipping form on which it was generated, stretching the region of said film in which said thickened reinforcement is located with the surface reversed on a stretching form similarly shaped to said dipping form but comprising tension exerting members positioned to exert tension on said region of the film, and completely curing said film while so positioned on said stretching form, so that, when in a relaxed position on a horizontal surface, said garment assumes a flat configuration with desired curved sides.

References Cited in the file of this patent

UNITED STATES PATENTS

| | | |
|---|---|---|
| 534,792 | Hardwick | Feb. 26, 1895 |
| 1,381,185 | Grimmelmann | June 14, 1921 |
| 1,515,381 | Boyer | Nov. 11, 1924 |
| 1,867,880 | Crockett | July 19, 1932 |
| 1,969,252 | Beal | Aug. 7, 1934 |
| 2,141,788 | Hurt | Dec. 27, 1938 |
| 2,359,948 | Tillotson | Oct. 10, 1944 |
| 2,384,056 | Tritt | Sept. 4, 1945 |
| 2,410,936 | Gronemeyer | Nov. 12, 1946 |
| 2,707,281 | Barth | May 3, 1955 |